Sept. 13, 1932.      L. T. SHARP      1,877,067
SOIL AUGER
Filed March 2, 1931

Inventor
Leslie T. Sharp
By Lyon & Lyon
Attorneys

Patented Sept. 13, 1932

1,877,067

UNITED STATES PATENT OFFICE

LESLIE T. SHARP, OF SANTA PAULA, CALIFORNIA

SOIL AUGER

Application filed March 2, 1931. Serial No. 519,321.

This invention relates to soil augers such as are employed for digging holes in the ground. The type of auger to which this invention relates is a rotary type in which the auger is composed of two oppositely disposed blades attached to the lower end of a rotary spindle. After rotating the auger until it has cut out a quantity of earth in the hole, the auger is raised and the earth removed from between the blades.

The general object of this invention is to improve the construction of such an auger so as to enable the earth taken up by the auger to be readily dumped.

In the preferred embodiment of the invention one of the blades is rigidly attached to the lower end of the spindle or shaft of the auger and the other blade is pivotally attached to the spindle or shaft so that it can swing outwardly.

One of the objects of this invention is to provide means for bracing the pivotally mounted blade when it is in its operative position, thereby reducing the strain on the pivot of the blade and increasing the durability and efficiency of the device.

Further objects of the invention will appear hereinafter.

The invention consists of novel parts and combinations of parts to be described hereinafter, all of which contribute to produce an efficient soil auger.

A preferred embodiment of the invention is described in the following specification, while the broad scope of the invention is pointed out in the appended claims.

Figures 1, 2, 3:
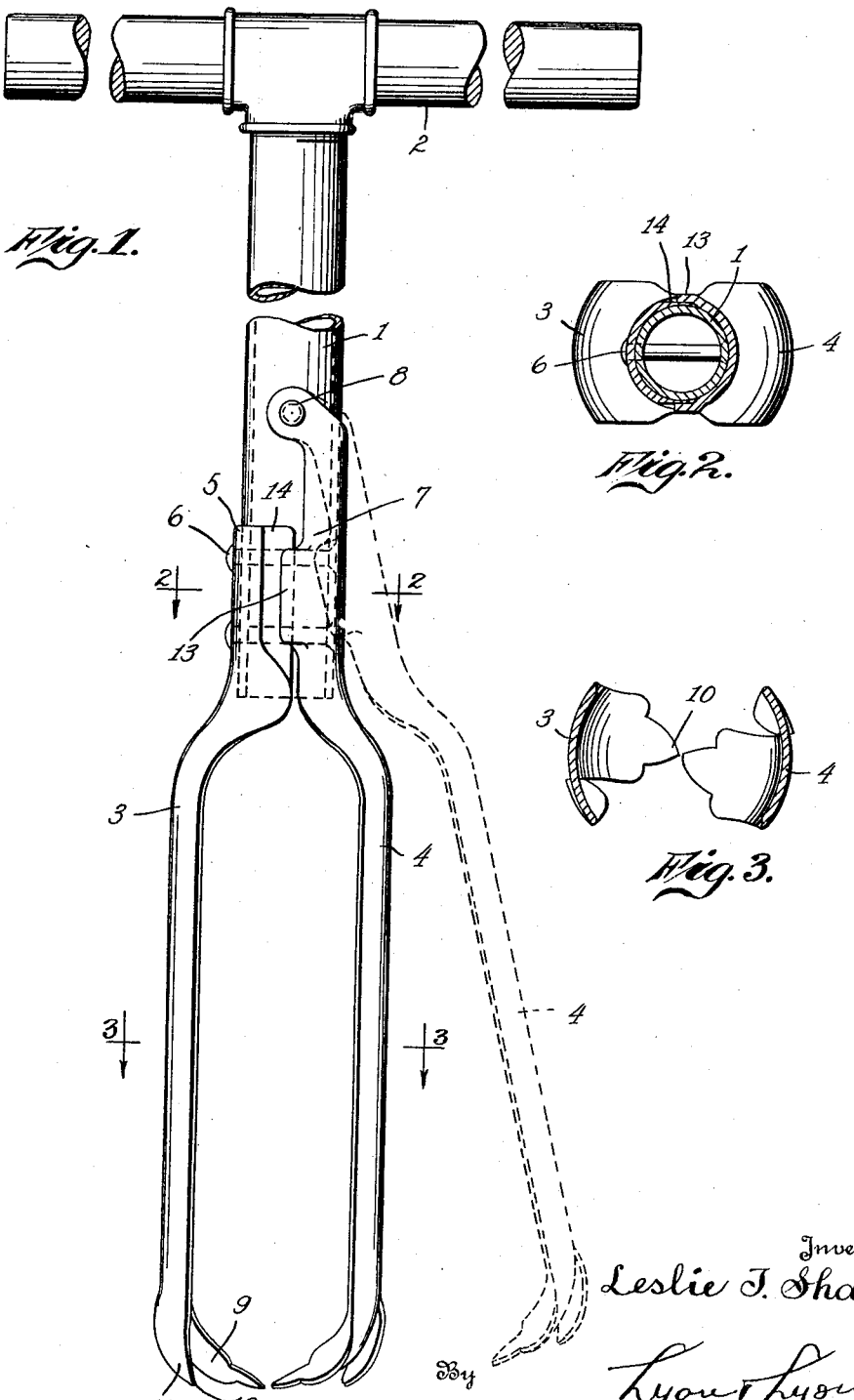
Figure 1 is a side elevation of an auger embodying my invention, the movable blade being shown in full lines in its operating position and in dotted lines in its open position, as in dumping the earth from the auger. In this view the shaft and portions of the rotating handle bar are broken away.
Figure 2 is a horizontal section taken on the line 2—2 of Figure 1 and illustrating details of the embodiment of the invention illustrated.
Figure 3 is a cross section on the line 3—3 of Figure 1 and further illustrating the construction of the auger at the tips of the blades to enable the auger to carry up the earth when it is being withdrawn from the hole.

Referring more particularly to the parts, 1 represents the shaft or spindle of the implement which may be formed out of ordinary pipe and provided at its upper end with a handle-bar 2 for rotating the spindle on its longitudinal axis. The auger includes two diametrically opposite blades 3 and 4, the former of which is formed with a shank 5 that is rigidly secured to the spindle 1 at its lower end, preferably by means of a pair of rivets 6.

The blade 4 is provided with a transversely curved integral shank 7 that extends upwardly on the spindle and is attached by a pivot pin 8 that passes through the spindle 1 diametrically. This pivot pin may be in the form of a rivet or bolt.

The bodies of the blades 3 and 4 are preferably of concavo-convex form, as illustrated in Figure 3, and the lower end of each blade has an inwardly turned extension 9, said extensions forming points 10 that come together substantially on the axis of the implement.

In addition to the inwardly turned tongues or teeth 9 the lower ends of the blades may be provided with outer extensions 11 that have points 12 that turn inwardly slightly and which assist the penetrating power of the implement when rotated.

In using a tool of this type it is rotated in the earth and in this way a quantity of loose earth is accumulated in the space between the blades. After rotating the tool for a time in the hole it can be withdrawn and the earth caught between the blades can be pulled out of the hole by reason of the inwardly turned inclined extensions 9 at the lower ends of the blade. After the earth has been removed in this way it can be readily dumped by shoving the pivoted blade 4 outwardly, as indicated by the dotted lines in Figure 1.

In rotating the tool in the hole there is considerable strain on the pivot 8, particularly if the pivoted blade strikes an obstruction such as a stone at its lower end. According to my invention I provide means for bracing the shank of the movable blade 4 on a part of the implement. For this purpose I provide means on the shank 7 for engaging the spindle 1 or the opposite shank 5, as illustrated in Figure 2. In order to accomplish this the shank 7 is made of curved form, as indicated in Figure 2, so that it conforms to the curvature or radius of the spindle 1, and in addition to this it is preferably formed with two projecting forks 13 that lie on opposite sides of the spindle. These forks may engage directly with the side of the pipe 1 but preferably are guided friction tight on substantially flat cheeks 14 that are formed on the shank 5, said cheeks being disposed in a plane substantially at right angles to the axis of the pivot 8. By reason of the engagement between the cheeks 14 and these forks 13, it will be evident that any forces acting on the blades 4 tending to move it laterally would be resisted by the reaction of these engaging points and this will relieve the strain on the pivots and also assists in preventing the pivoted blade from swinging outwardly on its pivot. At the same time the engagement at this point does not interfere in any way with the outward swinging movement of the blade to dump the earth after the auger has been withdrawn from the hole.

The curved form of the shank 7 enables it to lie close against the side of the tubular or cylinder spindle, and if the implement is to be used in soft ground, this curved shape of the shank substantially braces the movable blade and relieves the stresses on the pivot 8, but it is preferable to employ the extensions or forks 13 to give the implement its greatest range of usefulness.

The curved portion or body of the blades 3 and 4 is preferably offset outwardly from the axis of the spindle. The amount of this offsetting is determined by the diameter of the hole which the auger is to form.

In using the auger, it is pressed down while being rotated. The upward pressure of the earth below the auger exerted against the under sides of the inclined extensions cooperates to prevent the pivoted blade from swinging outwardly on its pivot.

It is understood that the embodiment of the invention described herein is only one of the many embodiments this invention may take, and I do not wish to be limited in the practice of the invention, nor in the claims, to the particular embodiment set forth.

I claim:

1. In a soil auger for making a hole in the ground, the combination of a rotary spindle, a pair of cutter blades carried on the lower end of the spindle and having bodies offset outwardly from the spindle and disposed on opposite sides of the axis of the spindle, one of said blades having a shank rigidly attached to the spindle, and the other of said blades having an integral shank extending upwardly with a pivot pin connecting the same to the spindle, the shank of the pivoted blade also having a pair of ears extending from the same on opposite sides of the spindle for engaging the same to brace the movable blade when the auger is being rotated, the said blades having inwardly disposed downwardly inclined extensions at their lower ends for engaging and lifting the earth from the hole.

2. A rotary auger for digging a hole in the ground having a rotary spindle, a pair of cutter blades carried on the lower end of the spindle and having bodies offset outwardly from the spindle and disposed on opposite sides of the axis of the spindle, one of said blades having a shank rigidly attached to the spindle and the other of said blades having a shank extending upwardly with a pivotal joint connecting the same to the spindle, the shank of the pivoted blade having a curved form enabling the same to fit around the spindle when the blade is disposed in its operative position and having projecting forks engaging the shank of the rigidly attached blade and operating to brace the blade against forces acting on the blade when the auger is rotated in the ground.

Signed at Santa Paula, California, this 21st day of February, 1931.

LESLIE T. SHARP.